United States Patent
Erkelenz et al.

(10) Patent No.: US 12,203,216 B2
(45) Date of Patent: Jan. 21, 2025

(54) METHOD AND DEVICE FOR THE DETERMINATION OF THE CONTAMINATION OF A SUCTION ROLL OF A MACHINE FOR PRODUCING A FIBROUS WEB

(71) Applicant: Voith Patent GmbH, Heidenheim (DE)

(72) Inventors: Marc Erkelenz, Neu-Ulm (DE); Jose Luiz Campos Souza, Heidenheim (DE)

(73) Assignee: Voith Patent GmbH, Heidenheim (DE)

( * ) Notice: Subject to any disclaimer, the term of this patent is extended or adjusted under 35 U.S.C. 154(b) by 614 days.

(21) Appl. No.: 17/619,101

(22) PCT Filed: May 12, 2020

(86) PCT No.: PCT/EP2020/063135
§ 371 (c)(1),
(2) Date: Dec. 14, 2021

(87) PCT Pub. No.: WO2020/249343
PCT Pub. Date: Dec. 17, 2020

(65) Prior Publication Data
US 2022/0267959 A1   Aug. 25, 2022

(30) Foreign Application Priority Data
Jun. 14, 2019 (DE) .......................... 102019116197.5

(51) Int. Cl.
*D21F 3/10* (2006.01)
*B01D 35/143* (2006.01)
*D21F 7/00* (2006.01)

(52) U.S. Cl.
CPC ............. *D21F 3/10* (2013.01); *B01D 35/143* (2013.01); *D21F 7/00* (2013.01)

(58) Field of Classification Search
CPC ..... D21F 3/10; D21F 3/04; D21F 1/32; D21F 5/02; D21F 1/345; D21F 9/006;
(Continued)

(56) References Cited

U.S. PATENT DOCUMENTS

| 4,756,183 A | 7/1988 | Rajala et al. |
| 2004/0237210 A1* | 12/2004 | Thoroe-Scherb ..... D21F 3/0254 8/115.51 |

(Continued)

FOREIGN PATENT DOCUMENTS

| AT | 510407 A4 | 4/2012 |
| DE | 3711553 A1 | 10/1987 |

(Continued)

OTHER PUBLICATIONS

FX 3345 FlexAir, Air Permeability Tester, Textest AG, Switzerland.
(Continued)

*Primary Examiner* — Brandi N Hopkins
(74) *Attorney, Agent, or Firm* — Laurence A. Greenberg; Werner H. Stemer; Ralph E. Locher

(57) ABSTRACT

A method and a suitable device determine the contamination of a suction roller of a machine for producing a fibrous web, in particular a paper, cardboard, tissue or pulp web. The method includes the steps of: a. flowing a fluid through a measurement area of a roller shell, wherein either the pressure or the throughflow speed of the fluid is kept constant; b. determining a characteristic variable, wherein the characteristic variable includes the resulting throughflow speed in the case of a throughflow at a constant pressure and of the resulting pressure drop in the case of the measurement at a constant throughflow speed; c. providing one or more reference variables; and d. determining a degree of contamination of the suction roller by way of comparison of the characteristic variable with the reference variable or variables.

20 Claims, 2 Drawing Sheets

(58) Field of Classification Search
CPC ... D21F 7/00; D21F 1/02; D21F 11/14; D21F 1/52; D21F 1/50; D21F 5/182; D21F 9/02; D21F 1/34; D21F 5/00; D21F 3/02; D21F 7/008; D21F 5/042; D21F 3/0209; D21F 1/0027; D21H 23/50; G01N 15/0826; B01D 35/143
See application file for complete search history.

(56) References Cited

U.S. PATENT DOCUMENTS

| | | | | |
|---|---|---|---|---|
| 2014/0298673 | A1* | 10/2014 | Herman | F26B 13/28 |
| | | | | 34/419 |
| 2015/0152599 | A1* | 6/2015 | Afflerbach | D21F 11/006 |
| | | | | 162/358.1 |

FOREIGN PATENT DOCUMENTS

| | | |
|---|---|---|
| DE | 102008002259 A1 | 12/2009 |
| DE | 102009027860 A1 | 1/2011 |
| DE | 102015220939 A1 | 4/2017 |

OTHER PUBLICATIONS

ISO 9237, Textiles-Determinatation of the Permeability of Fabrics to Air, 1995, International Organization for Standardization.

\* cited by examiner

METHOD AND DEVICE FOR THE DETERMINATION OF THE CONTAMINATION OF A SUCTION ROLL OF A MACHINE FOR PRODUCING A FIBROUS WEB

FIELD AND BACKGROUND OF THE INVENTION

The invention relates to a device and a method for the determination of the contamination of a suction roll of a machine for producing a fibrous web.

During the production of fibrous webs, in particular of paper webs, evacuated rolls are used at various locations. These usually comprise an at least partly perforated roll shell that is rotatable about its longitudinal axis, and an apparatus for applying a pressure difference between the surroundings and the interior of the roll. Suction rolls can be used firstly to hold the fibrous web on a specific item of clothing or to transfer it to the latter. In other applications, suction rolls are also used for dewatering the web. Water is sucked out of the web through an item of clothing into the interior of the roll. Together with the water, however, a large number of contaminants are also sucked away. These contaminants can be, for example, pulp fibers or else fillers and fines. As the operating period of the suction roll progresses, entire or partial blockage of the perforations of the roll shell occurs as a result. As a result of this contamination of the suction openings, the performance of the suction roll decreases continuously up to a point at which trouble-free operation of the roll is no longer possible.

In the prior art, in particular DE 10 2008 002 259, it has therefore been proposed to provide the suction rolls with a cleaning device. This cleaning device is set up to clean the suction holes of the roll by means of a cleaning medium under high pressure. However, as the same document explains, such cleaning is not possible during the continuing operation of the plant. Therefore, the cleaning is carried out only when the machine is stopped.

The disadvantage with the prior art is that no information is available to the operator as to whether or when the suction roll must be cleaned. Therefore, cleaning is carried out at regular intervals, specifically during stoppages which are necessary in any case. In order to reliably avoid disruption by the contamination, the operator must therefore carry out the cleaning earlier and more frequently than would actually be necessary as a result of the actual contamination. This leads to higher costs and outlay on personnel and to increased consumption of cleaning medium.

SUMMARY OF THE INVENTION

It is therefore an object of the invention to develop the prior art further in such a way that the cleaning intervals of the suction rolls can be lengthened and unnecessary cleaning can be avoided.

It is also an object of the invention to be able to determine the contamination of the suction roll reliably.

The objects are completely achieved by a method according to the characterizing clause of the independent method claim and a device according to the characterizing clause of the independent device claim. Advantageous embodiments are described in the sub-claims.

With regard to the method, the object is achieved by a method for the determination of the contamination of a suction roll of a machine for producing a fibrous web, in particular a paper, board, tissue or pulp web, which comprises the following steps.

a.) causing a fluid to flow through a measuring area A of the roll shell, either the pressure or the flow rate of the fluid being kept constant b.) determining a characteristic variable K, the characteristic variable K consisting of the resultant flow rate with flow at a constant pressure and of the resultant pressure drop during the measurement with a constant flow rate c.) providing one or more reference variables d.) determining a level of contamination of the suction roll by comparing the characteristic variable K with the reference variable or variables.

Within the context of this application, the area content of the area A or of the areas A is in each case understood to be the curved area of the cylindrical wall of the roll shell.

The flow rate is to be the volume flowing through the measuring area per unit time, specified, for example, in $mm^3/mm^2/s$.

The exact manner in which the level of contamination is determined can be matched to the needs of the respective user.

Advantageously, the determination of the level of contamination can be carried out in such a way that the value lies between 0 and 1, wherein, for example, "0" can stand for uncontaminated and "1" for completely contaminated.

One possible configuration of steps c) and d) can be:

c1.) determining a reference variable K0, which describes the characteristic variable for the uncontaminated suction roll d1.) determining a level of contamination of the suction roll by using the difference of the values K–K0 or the ratio K/K0

One possible example of this can be to determine the level of contamination V by means of $$V = \frac{K0 - K}{K0}$$

where K0 is the flow rate of the uncontaminated roll and K is the currently measured value of the flow rate.

Another possible example can be to determine the level of contamination V by means of $$V = \cos\left(\frac{K}{K0}\frac{\pi}{2}\right)$$

In this calculation, a slight drop in the flow rate would have a comparatively small influence on the calculated level of contamination than in the first example.

One further advantageous alternative can be to measure reference variables by means of measurement on deliberately contaminated holes. It is thus possible to produce a hole pattern which wholly or largely corresponds to the roll to be measured. To produce a reference variable, e.g. for 50% contamination, 50% of the holes of a measuring area can be blocked and a measurement can then be carried out on this area and a reference value $K_{50\%}$ obtained. If these measurements are repeated for different levels of contamination, a set of reference variables (e.g. $K_{15\%}$, $K_{25\%}$, $K_{50\%}$) is obtained. By comparing the characteristic variable K with the reference values or with a suitable interpolation/extrapolation of these reference values, a level of contamination can be determined. For a good-quality determination of the level of contamination, the use of 2, 3 or 4 or more reference values is advantageous.

The examples shown, which can thus also be used for the pressure drop, are not intended to restrict the invention but only by way of example to indicate the multiplicity of possible ways for determining the level of contamination from the measured values.

A great advantage of this method is that, as a result, the contamination of the suction roll can be assessed without removing it from the machine. This flow measurement needs only a few minutes of time and can therefore be carried out with very little effort during every similarly short machine stoppage. Therefore, the operator has the possibility of monitoring the development of contamination of the suction roll regularly. Cleaning the roll must therefore be carried out only when the level of contamination of the roll has reached a critical value. This critical value can be different, depending on the paper grade produced and the raw material quality. Alternatively, it can also be cleaned continuously in order that the contaminations do not harden and are thus practically no longer to be cleaned without removing the roll.

Nowadays, the contamination can at best be estimated visually during a stoppage with a roll installed in the machine. Here, however, the measuring person is a significant factor in possible erroneous estimates and, as a rule, does not deliver a constant estimate, instead is influenced by the form on the day. Likewise, several individuals have different subjective perceptions and thus, amongst other things, also supply highly different results and estimates.

As compared with a mere optical inspection of the suction roll by the operator's personnel, the method according to one aspect of the invention has the further great advantage that it determines the actual reduction in the permeability of the suction holes. Simple observation of the upper or underside of the suction holes cannot provide any information about the contamination in the central region of the holes in the roll shell which, to some extent, are up to 100 mm deep.

Since the suction roll may not necessarily be contaminated uniformly, it may be advantageous to carry out steps a.) and b.) several times (n times). The steps can be repeated, for example, at least 4 times, at least 8 times or at least 16 times. The measurements take place respectively on measuring areas Ai (i=1, ... n), by which means variables Ki are determined. The areas $A_i$ can be disjunct or at least partly overlap. The characteristic variable K can be formed as the average of the Ki. An arithmetic average is expedient here but other averages can also be formed, for example a weighted average which weights certain measuring positions more highly than others.

The fluid can preferably be a gas, in particular air.

In an advantageous refinement of the method, provision can be made for the flow to take place at a constant pressure, and for this pressure to be chosen between 20 [Pa] and 200 [Pa], in particular between 50 [Pa] and 150 [Pa].

In a further advantageous refinement of the method, provision can be made for the flow to take place at a constant flow rate, this rate being chosen between 250 [mm³/mm²/s] and 2000 [mm³/mm²/s], in particular between 500 [mm³/mm²/s] and 1000 [mm³/mm²/s].

Provision can preferably be made for the measuring area A or, during multiple measurement, at least one, in particular all, of the measuring areas $A_i$ to have an area content of less than 4000 mm², in particular between 2000 mm² and 3000 mm².

An excessively large measuring area has the disadvantage that, in particular in the case of little contaminated rolls, a relatively large volume of fluid flows through this measuring area. This leads to the measuring instrument having to cover a very wide measuring range between 'virtually no flow' in highly contaminated rolls as far as very high flow volumes. This makes the measuring instrument more complicated and more expensive as a result.

On the other hand, the size of the measuring area should not fall below 1000 mm², however, better still 2000 mm², in order that this still covers a sufficient number of suction holes in particular in the event of large hole diameters of, for example, 5 mm. In trials by the applicant, the range between 2000 mm² and 3000 mm² has proven to be optimal in this sense.

Furthermore, it may be advantageous if the determination of the level of contamination is carried out by a remaining running time R of the suction roll being carried out by comparing the characteristic variable K with the reference variable or variables.

The remaining running time R, therefore the time interval during which the suction roll can still be operated without risk before it must be replaced with a little too high contamination, may be an advantageous way of representing the level of contamination of the roll. The knowledge of a permissible remaining running time R is very important for the operator, since they can decide with very little effort whether, for example, the suction roll must already be removed and serviced during the current stoppage of the plant or whether it is therefore still possible to wait until the next planned maintenance stoppage of the plant.

In particular during the determination of the remaining running time, it may be advantageous to determine the associated reference variable or reference variables without any specific measurement, for example by means of calculations and/or simulations. Thus, for example, statements about the remaining running time of a suction roll for which no reference variables have yet been determined in advance as described above can be made very quickly.

One possibility for this is to determine the reference variable K0% for the flow through the uncontaminated suction roll for the known geometry of the roll and its roll pattern by means of flow simulations. Such a simulation is possible with comparatively little effort with the current technology and can if necessary be carried out directly on site by the service engineer who performs the contamination measurement.

Furthermore, it is possible to define a further reference variable Kmax which indicates the flow rate up to which or the pressure drop up to which the roll can still be operated. Here, it is possible to use a limit defined by the customer, which has been defined or measured on the basis of experience of the machine runnability and the removal of the roll resulting therefrom.

By comparing the measured characteristic variable K with K0% and Kmax, a remaining running time R can then be determined. Thus, for example, a linear contamination profile can be used as a basis. If, then, "n" days have elapsed since the installation or cleaning of the suction roll, the remaining running time R can be calculated by $$\frac{n+R}{n} = \left| \frac{(K\max - K0\%)}{(K - K0\%)} \right|$$

-continued $$R = \left|\frac{(K\max - K0\%)}{(K - K0\%)}\right| n - n$$

This calculation of R is intended to show, merely by way of example, how the method can be carried out. However, the invention is not restricted to this type of determination of R.

With regard to the device, the object is achieved by a device for the determination of the contamination of a suction roll of a machine for producing a fibrous web, in particular a paper, board, tissue or pulp web, comprising a fluid source which is set up to provide a fluid at a constant pressure or a constant flow rate, and measuring means for determining the flow rate and/or the pressure drop of the fluid, and a computing unit, wherein the device is set up to carry out a method according to one of the preceding claims.

In a preferred embodiment of the device, provision can be made for the device to comprise a first connecting piece having a first inlet and a first outlet, through which fluid can flow from the inlet to the outlet, wherein the inlet is or can be connected to the fluid source, and the outlet is shaped such that it can be placed on a first cylindrical roll shell and encloses a measuring area A there.

By means of the curved shape of the outlet, such a connecting piece ensures that the fluid from the pressure source is led exclusively through the holes in the roll shell. For this purpose, it is in particular advantageous if sealing means are provided on the outlet in order to seal off the interior of the connecting piece with respect to the surroundings. If the connecting piece is produced from a soft material such as, for example, a rubber, then the edge of the outlet itself can provide the sealing means. However, it is also possible, for example, for another suitable seal to be attached. Alternatively or additionally, it may also be advantageous if the edge itself has a certain thickness which amounts to at least 75%, advantageously at least 100%, in particular more than 150%, of the diameter of the largest suction hole, in order to prevent air leaks. With the usual hole diameters of about 5 mm, a wall thickness of more than 5 mm, in particular more than 7 mm, is advantageous. However, wall thicknesses of 10 mm and more are also possible.

The curved shape of the outlet further permits standard devices which already exist for other purposes to be used as a pressure source and measuring means. Such a device can be, for example, the air permeability tester FX3345 from the Swiss company "textest", which has been developed for the measurement of contaminated filter materials.

In order to simplify the use of standard devices, it is expedient if the first connecting piece is detachably connected to the fluid source.

Such a connecting piece can be made, for example, simply and inexpensively by means of an additive method. Since the connecting piece outside the fluid flow is not subjected to further loadings, no particularly high requirement has to be placed on the material used. It can be made of a plastic. In principle, even simple and inexpensive 3D printers can be used for the production.

In some applications, it may be advantageous if a flow-obstructing element, in particular a grille or filter element, is provided in the interior of the first connecting piece. If, for example, the selected fluid source is over-dimensioned with the effect that it provides the fluid with an excessively high pressure, then this can be adapted suitably by a suitably selected filter element. As an example of this, the aforementioned measuring device for filter papers is used. The latter provides the fluid (air) at a pressure which, in the case of a blocked filter paper, leads to a flow volume in the measuring range of the installed measuring means. In the event of a suction roll with a considerably lower flow resistance, this pressure would lead to a considerably higher flow volume, which possibly lies outside the measuring range. By providing a flow-obstructing element in the connecting piece, the flow resistance can be increased and therefore the flow volume can be reduced. Care should advantageously be taken that the element is as homogenous as possible in its structure over the area, in order that there is no possibility that possible eddies or the like will falsify or impair the measured result.

In particular, it may be advantageous if the flow-obstructing element can be removed simply from the connecting piece as needed and inserted again or an alternative flow-obstructing element can be interchanged. This also widens the area of use of the proposed device.

Alternatively or additionally, it may be advantageous if a second connecting piece having a second inlet and a second outlet is provided, wherein the second inlet is or can be connected to the fluid source additionally or alternatively to the first inlet, and wherein the second outlet is shaped such that it can be placed on a second cylindrical roll shell and encloses a measuring area A there, wherein the second cylindrical roll shell in particular has a different diameter from the first cylindrical roll shell.

BRIEF DESCRIPTION OF THE FIGURES

In the following, the invention will be explained further by using schematic figures, not to scale.

DETAILED DESCRIPTION OF THE INVENTION

Figure 1:
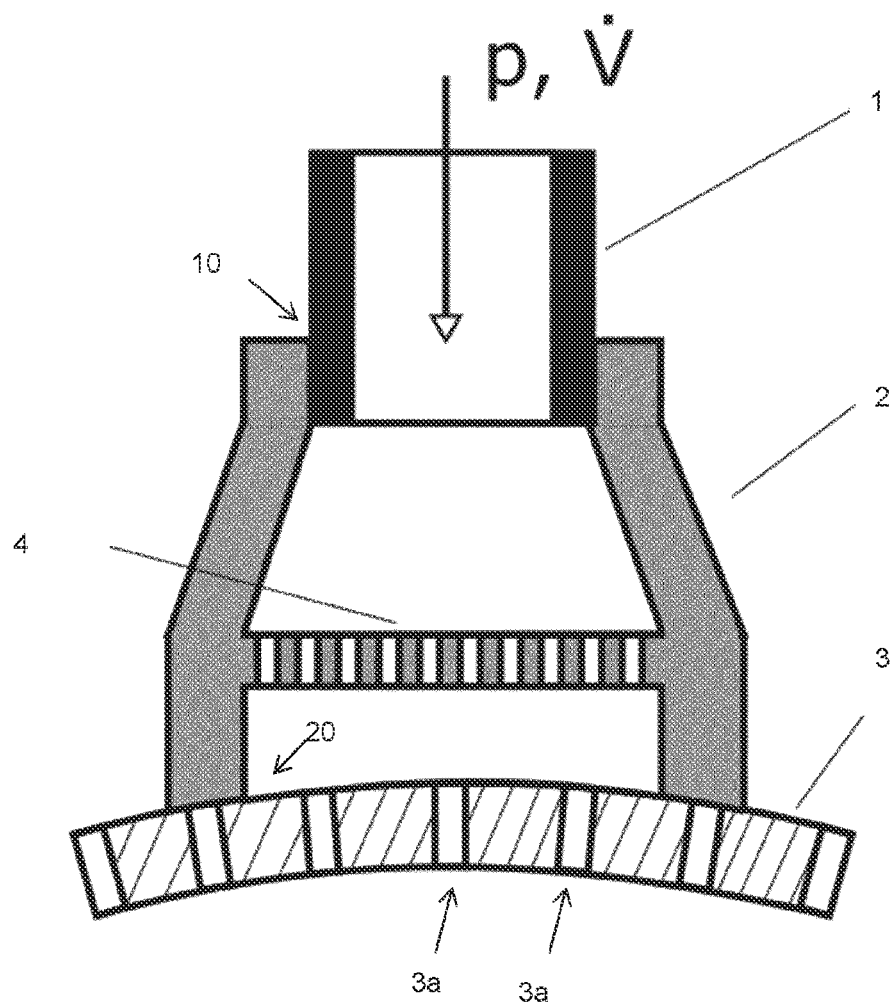
FIG. 1 shows, schematically, a device according to one aspect of the invention.

The device shown in FIG. 1 for the determination of the contamination of a suction roll has a fluid source 1, which provides a fluid, in particular air, at a pressure p and a flow rate $\dot{V}$. By means of the device, the fluid is led through the openings 3a of the roll shell 3 in the form of holes 3a. The pressure can be kept constant, and the resultant flow rate can be determined by measuring means, not illustrated here. Alternatively, with a constant flow rate, the resultant pressure drop can also be determined. The characteristic variable K thus determined can then be compared with a reference variable K0 for the uncontaminated roll, and a level of contamination can be determined therefrom.

Furthermore, the device has a connecting piece 2, in particular a first connecting piece 2. This has an inlet 10 and an outlet 20. This connecting piece 2 is connected to the fluid source 1 by its inlet 10. Fluid can flow through the connecting piece 2. The outlet 20 is shaped such that it can be placed on the cylindrical roll shell 3. It encloses the measuring area A and prevents the medium escaping into the surroundings. It is thus possible to ensure that the fluid flows exclusively through the openings 3a of the roll shell 3. In addition, sealing means can be provided at the edge of the outlet 20 in order to seal off the interior of the connecting piece 2 with respect to the surroundings. In particularly preferred embodiments, the edge of the outlet 20 itself can serve as a sealing means. Thus, for example, the edge of the outlet can consist of a soft material, in particular a rubber. Alternatively or additionally, it may also be advantageous if the edge itself has a certain thickness, which is at least 75%, advantageously at least 100%, in particular more than 150%, of the diameter of the largest suction hole 3a. With the usual hole diameters of about 5 mm, a wall thickness of more than 5 mm, in particular more than 7 mm, is advantageous. However, wall thicknesses of 10 mm and more are also possible.

Figure 2A:
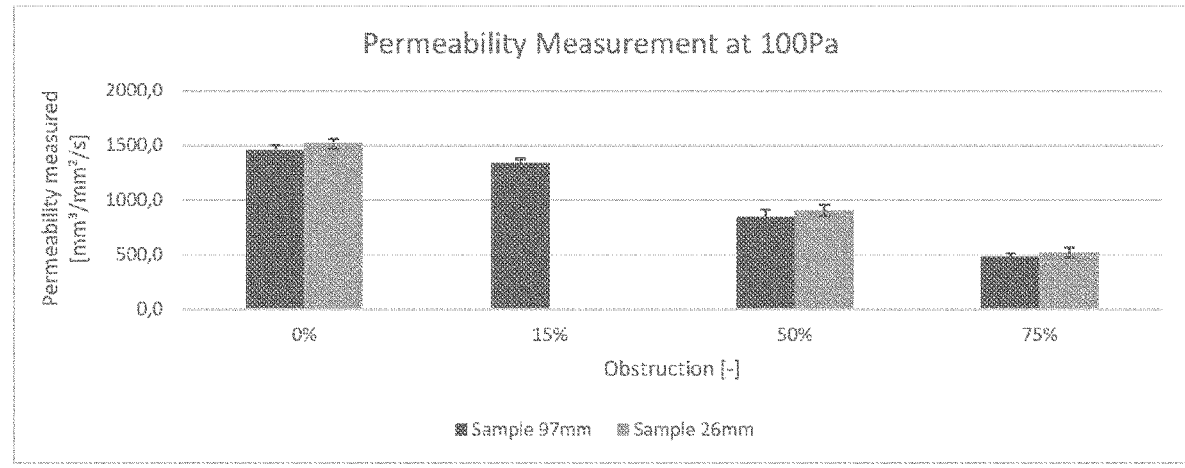
FIGS. 2a and 2b show trial results for different aspects of the invention.
Figure 2B:
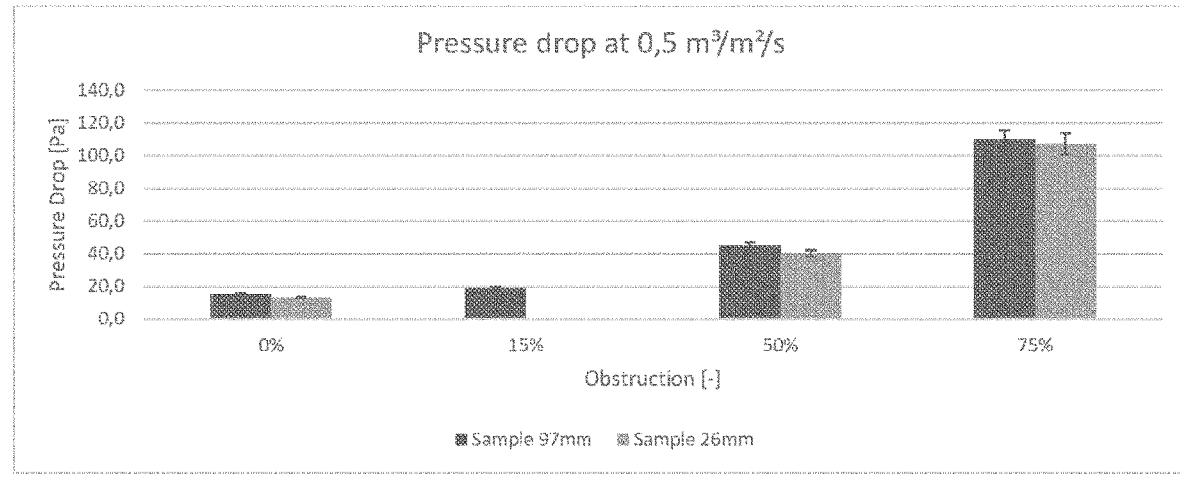

FIGS. 2a and 2b show trial results from two series of measurements. For the results from FIG. 2a, the fluid was provided at a constant pressure of 100 Pa, and the resultant flow rate was determined. For the results from FIG. 2b, the fluid was provided with a constant flow rate of 0.5 m$^3$/m$^2$/2 (corresponding to 500 mm$^3$/mm$^2$/s), and the resultant pressure drop was measured. Both series of trials were each carried out for rolls with holes of different depths (97 mm and 26 mm). In addition, the method described at the beginning was used, that in addition to measurements on the uncontaminated roll (0%), measurements were carried out on the same roll in which 15%/50%/75% of the holes were closed.

The graphics show that the differences in the measured values as a result of the different contamination in the two cases were sufficiently higher than the standard deviation of the measured values.

By means of interpolation of these respective four measured values, an interpolation function can then be created which produces a functional relationship between level of contamination ('obstruction') and the measured characteristic variable. This functional relationship can, for example, be stored in a computing unit, which then determines a level of contamination from the currently measured value of the characteristic variable.

The invention claimed is:

1. A method for determining contamination of a suction roller of a machine for producing a fibrous web, which comprises the following steps of:
   a) causing a fluid to flow through a measuring area A of a roller shell, either a pressure or a flow rate of the fluid being kept constant;
   b) determining a characteristic variable K, the characteristic variable K including the flow rate with a flow at a constant pressure and of a resultant pressure drop during a measurement with a constant flow rate;
   c) providing at least one reference variable; and
   d) determining a level of the contamination of the suction roller by comparing the characteristic variable K with the at least one reference variable.

2. The method according to claim 1, which further comprises repeating the steps a) and b) n times on measuring areas $A_i$(i=1, . . . n), by which means variables $K_i$ are determined and the characteristic variable K is formed as an average of the variables $K_i$.

3. The method according to claim 2, wherein the measuring area A or at least one of the measuring areas $A_i$ has an area content of less than 4000 mm$^2$.

4. The method according to claim 2, wherein the n times is selected from the group consisting of at least 4 times and at least 8 times.

5. The method according to claim 2, wherein the measuring area A or at least one of the measuring areas $A_i$ has an area content of between 2000 mm$^2$ and 3000 mm$^2$.

6. The method according to claim 1, which further comprises providing a gas as the fluid.

7. The method according to claim 6, which further comprises providing air as the gas.

8. The method according to claim 1, which further comprises maintaining the flow at the constant pressure, and the constant pressure is chosen between 20 Pa and 200 Pa.

9. The method according to claim 1, which further comprises maintaining the flow at the constant flow rate, wherein the constant flow rate is chosen between 250 mm$^3$/mm$^2$/s and 2000 mm$^3$/mm$^2$/s.

10. The method according to claim 1, wherein the determining of the level of the contamination is carried out by a remaining running time R of the suction roller being carried out by comparing the characteristic variable K with the at least one reference variable.

11. The method according to claim 1, which further comprises selecting the fibrous web from the group consisting of paper, a board, tissue or a pulp web.

12. The method according to claim 1, which further comprises maintaining the flow at the constant pressure, and the constant pressure is chosen between 50 Pa and 150 Pa.

13. The method according to claim 1, which further comprises maintaining the flow at the constant flow rate, wherein the constant flow rate is chosen between 500 mm$^3$/mm$^2$/s and 1000 mm$^3$/mm$^2$/s.

14. A device for determining a contamination of a suction roller of a machine for producing a fibrous web, the device comprising:
   a fluid source set up to provide a fluid at a constant pressure or a constant flow rate;
   measuring means for determining a flow rate and/or a pressure drop of the fluid; and
   a computer, the device being set up to carry out a method for determining the contamination of the suction roller, which comprises the following steps of:
   a) causing the fluid to flow through a measuring area of a roller shell, either a pressure or the flow rate of the fluid being kept constant;
   b) determining a characteristic variable K, the characteristic variable K including the flow rate with the flow at the constant pressure and of a resultant pressure drop during a measurement with the constant flow rate;
   c) providing at least one reference variable; and
   d) determining a level of the contamination of the suction roller by comparing the characteristic variable K with the at least one reference variable.

15. The device according to claim 14, further comprising a first connecting piece having a first inlet and a first outlet, through which the fluid can flow from said first inlet to said first outlet, wherein said first inlet is or can be connected to said fluid source, and said first outlet is shaped such that it can be placed on the roller shell being a first cylindrical roller shell and encloses a measuring area there.

16. The device according to claim 15, further comprising a sealing means provided on said first outlet in order to seal off an interior of said first connecting piece with respect to surroundings.

17. The device according to claim 15, wherein said first connecting piece is detachably connected to said fluid source.

18. The device according to claim 15, further comprising a flow-obstructing element disposed in an interior of said first connecting piece.

19. The device according to claim 18, wherein said flow-obstructing element is a grille or a filter element.

20. The device according to claim 15, further comprising a second connecting piece having a second inlet and a second outlet, said second inlet is or can be connected to said fluid source additionally or alternatively to said first inlet, and said second outlet is shaped such that it can be placed on a second cylindrical roller shell and encloses the measuring area A there, wherein the second cylindrical roller shell has a different diameter from the first cylindrical roller shell.

* * * * *